United States Patent
Beifus et al.

(10) Patent No.: US 10,528,408 B2
(45) Date of Patent: Jan. 7, 2020

(54) SYMMETRIC CONNECTIVITY OVER SCSI WHERE THE INITIATOR AND TARGET ARE SYMMETRIC

(71) Applicant: International Business Machines Corporation, Armonk, NY (US)

(72) Inventors: Kobi Beifus, Tel Aviv (IL); Dan Ben-Yaacov, Tel Aviv (IL); Ofer Leneman, Kfar Saba (IL); Amit Margalit, Hod-Hasharon (IL); Rivka Matosevich, Zichron-Ya'acov (IL); Tamar Shacked, Ramat-Hasaron (IL); Ovad Somech, Rishon LeZion (IL)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/913,213

(22) Filed: Mar. 6, 2018

(65) Prior Publication Data
US 2019/0278650 A1    Sep. 12, 2019

(51) Int. Cl.
*G06F 11/00* (2006.01)
*G06F 11/07* (2006.01)
(Continued)

(52) U.S. Cl.
CPC ...... *G06F 11/0757* (2013.01); *G06F 11/0727* (2013.01); *G06F 11/0745* (2013.01);
(Continued)

(58) Field of Classification Search
CPC ............. G06F 11/0727; G06F 11/0745; G06F 11/0757; G06F 11/0772; G06F 11/1625; G06F 2213/0036
See application file for complete search history.

(56) References Cited

U.S. PATENT DOCUMENTS 5,774,643 A    6/1998   Lubbers et al.
5,790,775 A    8/1998   Marks et al.
(Continued)

FOREIGN PATENT DOCUMENTS

WO    WO 98/34456 A2    8/1998

OTHER PUBLICATIONS

Khoo, Patrick B. et al., "Introducing a Flexible Data Transport Protocol for Network Storage Applications", NASA, Tenth Goddard Conference on Mass Storage Systems and Technologies, College Park, Maryland, NASA Conference Publication, Apr. 15-18, 2002, pp. 241-258.
(Continued)

*Primary Examiner* — Michael Maskulinski
(74) *Attorney, Agent, or Firm* — Stephen R. Tkacs; Stephen J. Walder, Jr.; Jason Sosa

(57) ABSTRACT

A mechanism is provided in a data processing system comprising a processor and a memory, the memory comprising instructions that are executed by the processor to specifically configure the processor to implement an initiator entity in a symmetric split-direction connection. The initiator entity generates a custom keepalive command and sends the custom keepalive command to a target entity via the symmetric split-direction connection. Responsive to the initiator entity determining a number of consecutive acknowledgement commands received in response to custom keepalive commands exceed a first threshold, the initiator entity reports the symmetric split-direction connection as sufficient. Responsive to the initiator entity determining a second number of consecutive keepalive commands sent without receiving an acknowledgement is greater than a second threshold, the initiator entity reports the symmetric split-direction connection as insufficient.

20 Claims, 4 Drawing Sheets

(51) Int. Cl.
*G06F 13/16* (2006.01)
*G06F 13/40* (2006.01)

(52) U.S. Cl.
CPC ...... *G06F 11/0772* (2013.01); *G06F 13/1689* (2013.01); *G06F 13/4068* (2013.01); *G06F 2213/0036* (2013.01)

(56) References Cited

U.S. PATENT DOCUMENTS

| | | | |
|---|---|---|---|
| 5,884,018 | A | 3/1999 | Jardine et al. |
| 6,002,851 | A | 12/1999 | Basavaiah et al. |
| 7,484,039 | B2 | 1/2009 | Qiu et al. |
| 9,210,596 | B1 * | 12/2015 | Chen .................... H04W 76/19 |
| 9,338,050 | B2 | 5/2016 | Cai |
| 2003/0120716 | A1 * | 6/2003 | McClellan .............. H04L 45/24 709/201 |
| 2004/0249997 | A1 | 12/2004 | Umberhocker et al. |
| 2017/0064007 | A1 | 3/2017 | Brown |
| 2017/0155573 | A1 * | 6/2017 | Khemani ........... H04L 41/0663 |

OTHER PUBLICATIONS

Xavier, Felix , "Storage Grid Using iSCSI", USENIX, Fast '15, 13th USENIX Conference on File and Storage Technologies, Santa Clara, CA, Feb. 16-19, 2015, 26 pages.

\* cited by examiner

SYMMETRIC CONNECTIVITY OVER SCSI WHERE THE INITIATOR AND TARGET ARE SYMMETRIC

BACKGROUND

The present application relates generally to an improved data processing apparatus and method and more specifically to mechanisms for symmetric connectivity over Small Computer System Interface (SCSI) where the initiator and target are symmetric.

Small Computer System Interface (SCSI) is a set of standards for physically connecting and transferring data between computers and peripheral devices. The SCSI standards define commands, protocols, electrical and optical interfaces. SCSI is most commonly used for hard disk drives and tape drives, but it can connect a wide range of other devices.

Peer to Peer Remote Copy or PPRC is a protocol to replicate a storage volume to another control unit in a remote site. Synchronous PPRC causes each write to the primary volume to be performed to the secondary as well. The input/output (I/O) is only considered complete when update to both primary and secondary have completed. PPRC can be used to provide very fast data recovery due to failure of the primary site.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions that are executed by the processor to specifically configure the processor to implement an initiator entity in a symmetric split-direction connection. The method comprises generating, by the initiator entity, a custom keepalive command and sending the custom keepalive command from the initiator entity to a target entity via the symmetric split-direction connection. The method further comprises, responsive to the initiator entity determining a number of consecutive acknowledgement commands received in response to custom keepalive commands exceeds a first threshold, reporting, by the initiator entity, the symmetric split-direction connection as sufficient. The method further comprises, responsive to the initiator entity determining a second number of consecutive keepalive commands sent without receiving an acknowledgement is greater than a second threshold, reporting, by the initiator entity, the symmetric split-direction connection as insufficient.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
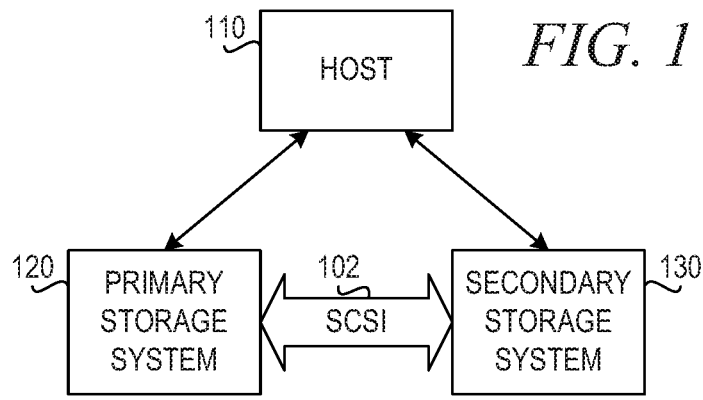
FIG. 1 is a block diagram of a peer-to-peer remote copy environment in which aspects of the illustrative embodiments may be implemented.

In a complex environment in which two storage systems expose a distributed resource, with one system acting as arbiter, both systems must become aware of connectivity failures quickly and maintain a working bidirectional connection with the other system to mitigate the risk of data becoming inconsistent between the two systems when a failure occurs. The illustrative embodiments provide a mechanism to perform symmetric connectivity over a split-direction Small Computer System Interface (SCSI) connection, for example Fibre Channel where each link is a fiber pair with each fiber carrying data in one direction and each fiber pair normally being used as either an initiator or a target.

In accordance with the illustrative embodiments, each initiator on the system periodically sends a "keepalive" packet and monitors the results, looking for consecutive failures and/or successes. At the same time, each target monitors for the same type of packets coming from the remote system's initiator(s). A central entity in the system keeps track of the number of initiator and target links that are connected to each remote system. The packets are sent with enough information to allow the remote target to also understand what the remote initiator is reporting to its own central entity, thus allowing the mechanism to assess whether the situation provides symmetric connectivity.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

FIG. 1 is a block diagram of a peer-to-peer remote copy environment in which aspects of the illustrative embodiments may be implemented. The peer-to-peer remote copy environment includes a host 110, a primary storage system 120, and a secondary storage system 130. Synchronous peer-to-peer remote copy (PPRC) causes each write to the primary storage system 120 to be performed to the secondary storage system 130 as well and the I/O is only considered complete when update to both primary and secondary have completed.

The IBM HyperSwap® function may be used in a PPRC environment. By design it facilitates the immediate switching of PPRC mirrored disk subsystems. The HyperSwap® function significantly enhances the ability to provide non-interrupted operations by switching I/O operations from primary storage system 120 to the PPRC-mirrored secondary storage system 130 in real time without requiring application restarts. By implementing the HyperSwap® function, disk failures, maintenance functions, and hardware implementations can be endured without incurring a service interruption.

Connection 102 provides a long distance connection between primary storage system 120 and secondary storage system 130. In accordance with an illustrative embodiment, connection 102 may comprise a split-direction small computer system interface (SCSI) connection, such as Fibre Channel, where each link is a fiber pair with each fiber carrying data in one direction and each fiber pair normally being used as either initiator or target.

For PPRC and the HyperSwap® function to operate properly, both systems 120, 130 must become aware of connectivity failures quickly and must maintain a working bi-directional connection with each other to mitigate the risk of data becoming inconsistent between the two storage systems 120, 130 when a failure does occur.

In accordance with an illustrative embodiment, each of the two systems 120, 130 has one or more initiator-mode connections and one or more target-mode connections to the other system. Each system must be both an initiator and a target at the same time. The initiators on each of the two systems 120, 130 send "keepalive" packets to the targets and monitor the results, looking for consecutive failures and/or successes. At the same time, the targets on each of the two systems monitor for keepalive packets coming from the remote system's initiators. The target sends an acknowledgement for each keepalive packet. A central entity in each system keeps track of the number of initiator and target links that are connected to each remote system. The initiator sends the keepalive packets with enough information to allow the remote target to also understand what the remote initiator is reporting to its own central entity, thus allowing the mechanism to assess whether the situation provides symmetric connectivity. The host 110 is the user's host, which uses one or more volumes exported by the two systems 120, 130, and in the HyperSwap® function, the host 110 may use just the primary storage system 120 until the primary storage system fails, and then the host 110 is able to switch to the secondary storage system 130 in a seamless way.

Figure 2:
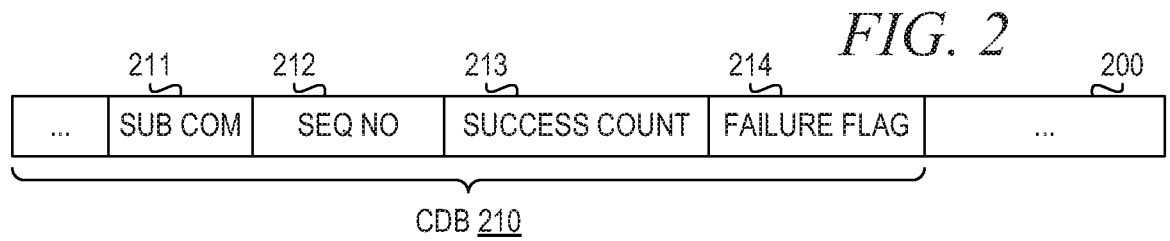
FIG. 2 depicts an example custom command to serve as a keepalive packet in accordance with an illustrative embodiment.

FIG. 2 depicts an example custom command to serve as a keepalive command in accordance with an illustrative embodiment. The keepalive command may take the form of a custom SCSI command. In the depicted example, the command 200 includes a command descriptor block (CDB) 210 containing a subcommand 211, a sequence number 212, a success count 213, and failure flag 214. The CDB includes a command identifier (not shown) that identifies the command as a custom SCSI command. The subcommand 211 identifies the particular keepalive command. Alternatively, the illustrative embodiment may use a custom SCSI command without any subcommand.

The sequence number 212 allows the target entity on the remote side to track how many consecutive keepalive commands have been received. The keepalive acknowledgment is a standard SCSI acknowledgement (ACK). The ACK returned can be easily attributed to the specific keepalive sequence number that it is acknowledging.

Success count 213 represents a count of the number of acknowledged keepalive commands that were completed successfully and consecutively. The initiator may include a success count 213 to ensure the connection is symmetric. The target may convey the success count in the acknowledgment (e.g., in SCSI, a sense code may be used for this). That is, the initiator and target may tell each other the number of consecutive successful keepalive commands each is currently counting to determine whether the numbers are consistent. Alternatively, the CDB may include a sequence number of the last successfully acknowledged keepalive. Ideally, each keepalive command is acknowledged and the sequence number of the last acknowledged keepalive is one less than the sequence number of the current keepalive command. Simply subtracting the sequence number of the last acknowledged keepalive from the current sequence number minus one would give the number of consecutive failed keepalive commands.

The failure flag may indicate to the target whether the initiator is currently reporting a failure to its central entity. In one embodiment, a failure is a connection that is insufficient for the environment (e.g., a PPRC environment or a HyperSwap® environment). Reporting failure in the CDB 210 of the keepalive command (or acknowledgement) allows both systems to identify the failures at almost the same time, thus reducing the risk of data inconsistencies when connections fail.

The target sends an acknowledgement response. The initiator may determine which keepalive commands have been acknowledged and to determine how many consecutive keepalive commands have been received successfully. The success count 213 allows the initiator to determine whether the target is experiencing the same number of consecutive commands. The failure flag 214 in the acknowledgement command indicates to the initiator whether the target is reporting a failure to its central entity.

Figure 3:
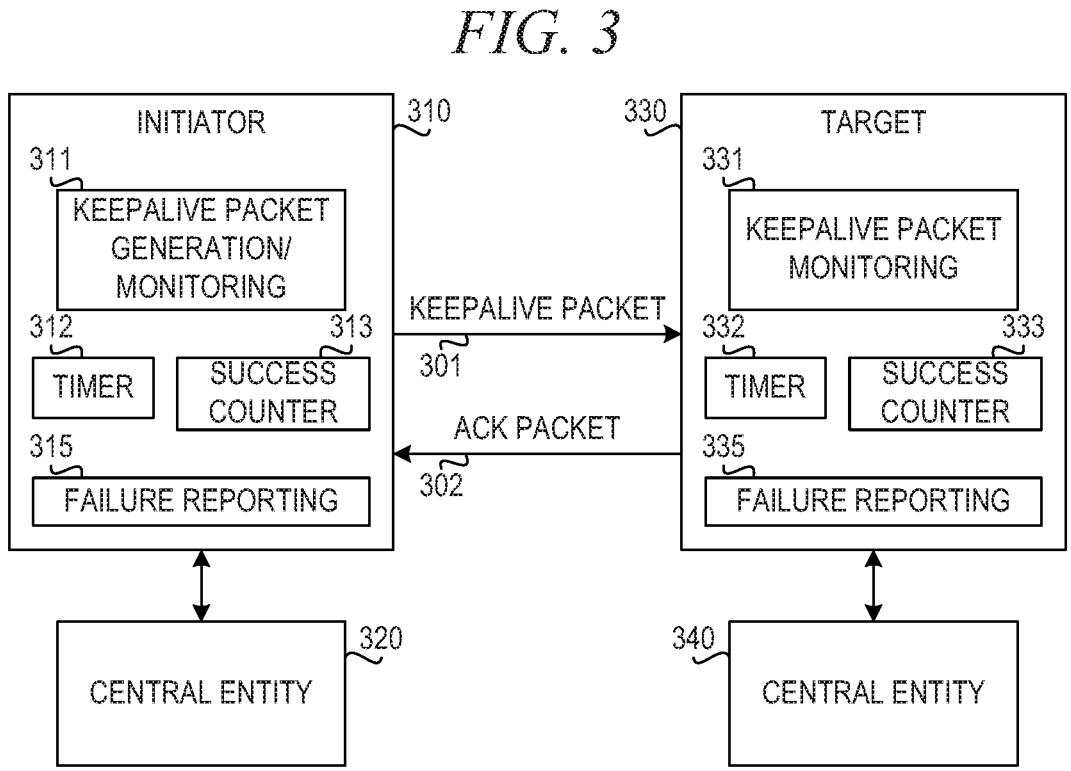
FIG. 3 is a block diagram of a symmetric connection in accordance with an illustrative embodiment.

FIG. 3 is a block diagram of a symmetric connection in accordance with an illustrative embodiment. Initiator entity 310 is connected to target entity 330 via a SCSI connection 301, 302. In one embodiment, connection 301, 302 is a Fibre Channel connection, where each link is a fiber pair with each fiber carrying data in one direction, and each fiber pair being used as either initiator or target. Thus, for example, SCSI connection 301, 302 includes a first fiber 301 being used as initiator and a second fiber 302 being used as target.

Initiator 310 includes a keepalive packet generation/monitoring component 311, which generates a custom SCSI command. Initiator 310 sends the keepalive packet or command via fiber 301 to the remote side, i.e., target 330. Target 330 includes a keepalive packet monitoring component 331, which responds with an acknowledgement response. Target 330 sends the acknowledgement packet or command via fiber 302 to initiator 310. At the initiator 310, keepalive packet generation/monitoring component 311 monitors for an acknowledgement for the keepalive command from the target 330.

Initiator 310 also includes timer 312, success counter 313, and failure reporting component 315. Initiator 310 restarts timer 312 each time a keepalive packet is sent to the target. Whenever timer 312 expires, keepalive packet generation/monitoring component 311 generates and sends a new keepalive packet. If an acknowledgement is received for a keepalive packet from the target, then initiator 310 considers the keepalive packet as a success. Initiator 310 counts the number of consecutive successful keepalive commands using success counter 313.

If initiator 310 sends multiple keepalive packets without receiving an acknowledgement, then timer 312 will have expired multiple times. Failure reporting component 315 determines whether to report a failure or insufficient connection based on a value of success counter 313 or whether a predetermined number of consecutive keepalive packets have been sent without acknowledgement. Failure reporting component 315 may compare success counter 313 to a first threshold (T1). Failure reporting component 315 may determine whether a number of consecutive keepalive commands without acknowledgement is greater than a second threshold (T2). Thus, if the number of consecutive successes, as determined by success counter 314, exceeds the first threshold, then initiator 310 reports the connection as good or sufficient. Failure reporting component 315 may report the connection as good to central system 320 and/or may deassert the failure flag in subsequent keepalive commands.

Keepalive packet generation/monitoring component 311 may record the sequence number of the last received keepalive acknowledgement command. Failure reporting component 315 may determine the number of consecutive keepalive commands without an acknowledgement by subtracting the sequence number of the last acknowledgement to the current sequence number. Alternatively, failure reporting component 315 may use a failure counter to count the number of consecutive keepalive commands acknowledged. If the number of consecutive failures, as determined by failure counter 315, exceeds the second threshold (T2), then initiator 310 reports the connection as failed or insufficient. Failure reporting component 315 may report the connection as failed to central system 320 and/or may assert the failure flag in subsequent keepalive commands.

In one embodiment, the values of the first threshold and the second threshold are chosen such that identifying a failure is quick and such that recovering from a failed connection takes significantly longer than identifying the failure. In one example embodiment, the thresholds may be selected such that the first threshold is significantly higher than the second threshold. For example, the first threshold may be twice the second threshold plus one. Thus, if the second threshold is nine (9), then the first threshold may be nineteen (19). This ensures that the status of the connection does not bounce back and forth between good and bad or between sufficient and insufficient.

Target 330 also includes timer 332, success counter 333, and failure reporting component 335. Each time a keepalive packet is received; keepalive packet monitoring component 331 restarts timer 332, increments success counter 333, and generates a keepalive acknowledgement packet. Target 330 sends the keepalive acknowledgement via fiber 302. If timer 332 expires, then failure reporting component 335 reports the connection as failed or insufficient. To be truly symmetric, timer 332 may be set to a time equal to timer 312 times the second threshold (T2). This way, the same number of failed keepalive commands will result in the same amount of time expiring in both the initiator 310 (timer 312 times T2) and the target 330 (timer 332=timer 312 times T2).

If keepalive packet monitoring component 331 receives a keepalive command with a sequence number that is not consecutive with respect to a previous keepalive command, then target 330 resets success counter 333. Thus, success counter 333 counts the number of consecutive successful keepalive packets. If the number of consecutive successes, as determined by success counter 333, exceeds a first threshold, then target 330 reports the connection as good or sufficient. Failure reporting component 335 may report the connection as good to central system 340.

Figure 4:
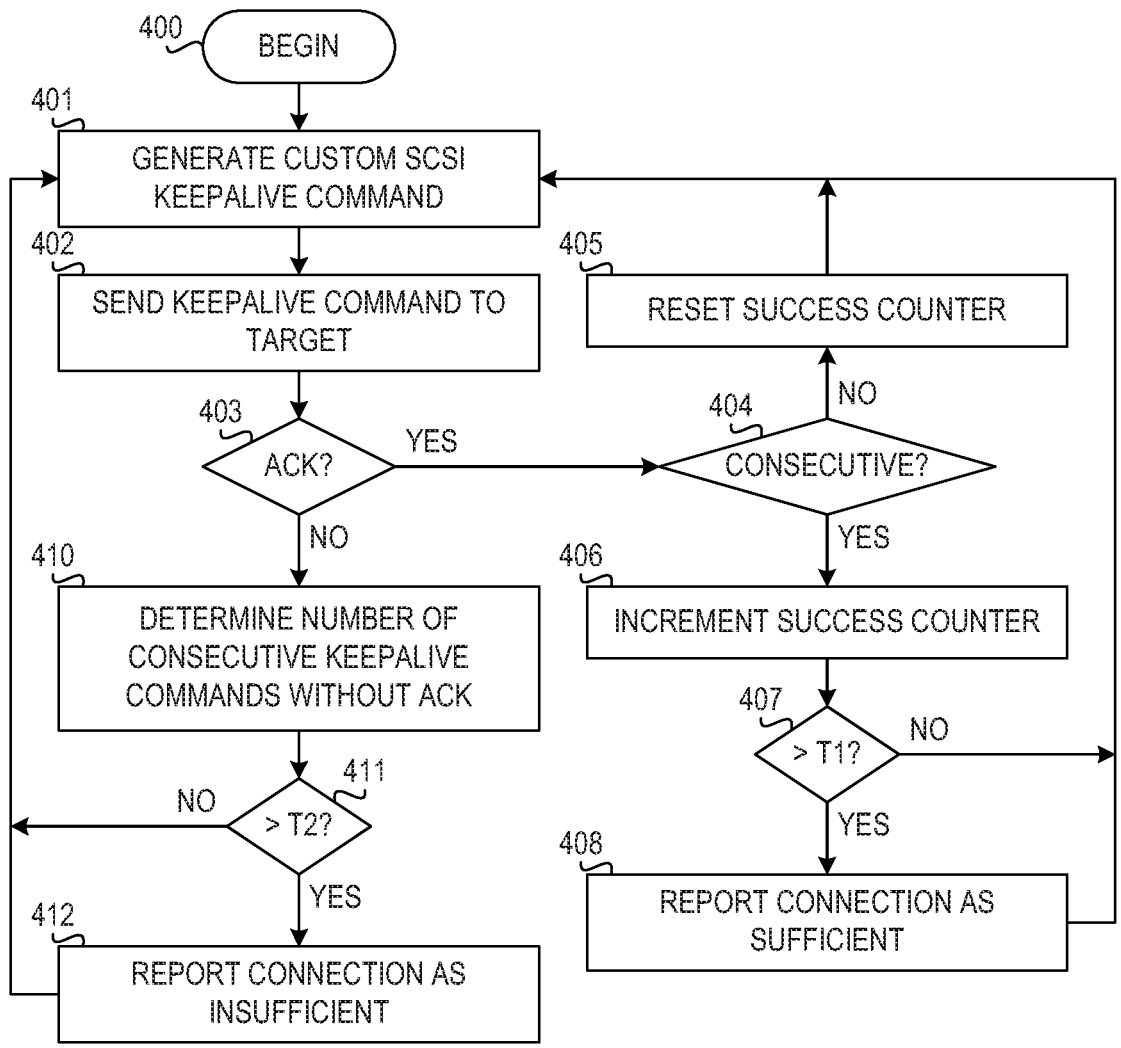
FIG. 4 is a flowchart illustrating operation of an initiator for symmetric connectivity over SCSI in accordance with an illustrative embodiment.

FIG. 4 is a flowchart illustrating operation of an initiator for symmetric connectivity over SCSI in accordance with an illustrative embodiment. Operation begins (block 400), and the initiator generates a custom SCSI keepalive command (block 401) and sends the keepalive command to the target (block 402). Although not shown, the initiator generates and sends the keepalive command periodically in response to a timer expiring. The keepalive command may be a custom SCSI command comprising a command descriptor block including a subcommand identifier, a sequence number, a success counter or sequence number of a last received keepalive acknowledgement, and a failure flag.

The initiator determines whether an acknowledgement is received (block 403). If an acknowledgement is received, the initiator determines whether the acknowledgement is consecutive (block 404). The initiator may determine whether the acknowledgement is consecutive by inspecting the sequence number of the acknowledgement command. If the acknowledgement is not consecutive, then the initiator resets a success counter representing a number of consecutive successful keepalive commands (block 405). Operation then returns to block 401 to generate a custom SCSI keepalive command (in response to expiration of the timer).

If the initiator determines that the acknowledgement command is consecutive in block 404, then the initiator increments the success counter (block 406). The initiator then determines whether the success counter is greater than a first threshold (T1) (block 407). If the success counter is not greater than the first threshold, then operation returns to block 401 to generate a custom SCSI keepalive command (in response to expiration of the timer).

If the success counter is greater than the first threshold in block 407, then the initiator reports the connection as sufficient (block 408). The initiator may report the connection as sufficient to a central system or may deassert a failure flag in subsequent keepalive commands. Thereafter, operation returns to block 401 to generate a custom SCSI keepalive command (in response to expiration of the timer).

Returning to block 403, if the initiator determines that an acknowledgement is received, the initiator determines a number of consecutive keepalive commands without an acknowledgement (block 410). The initiator may determine the number of consecutive keepalive commands without an acknowledgement by subtracting a sequence number of the last acknowledgement from the current sequence number. Alternatively, the initiator may determine the number of consecutive keepalive commands without an acknowledgement using a counter. The initiator then determines whether the number of consecutive keepalive commands without an acknowledgement is greater than a second threshold (T2) (bock 411). If the number of consecutive keepalive commands without an acknowledgement is not greater than the second threshold, then operation returns to block 401 to generate a custom SCSI keepalive command (in response to expiration of the timer).

If the number of consecutive keepalive commands without an acknowledgement is greater than the second threshold in block 411, then the initiator reports the connection as insufficient (block 412). The initiator may report the connection as insufficient to a central system or may assert a failure flag in subsequent keepalive commands. Thereafter, operation returns to block 401 to generate a custom SCSI keepalive command (in response to expiration of the timer).

Figure 5:
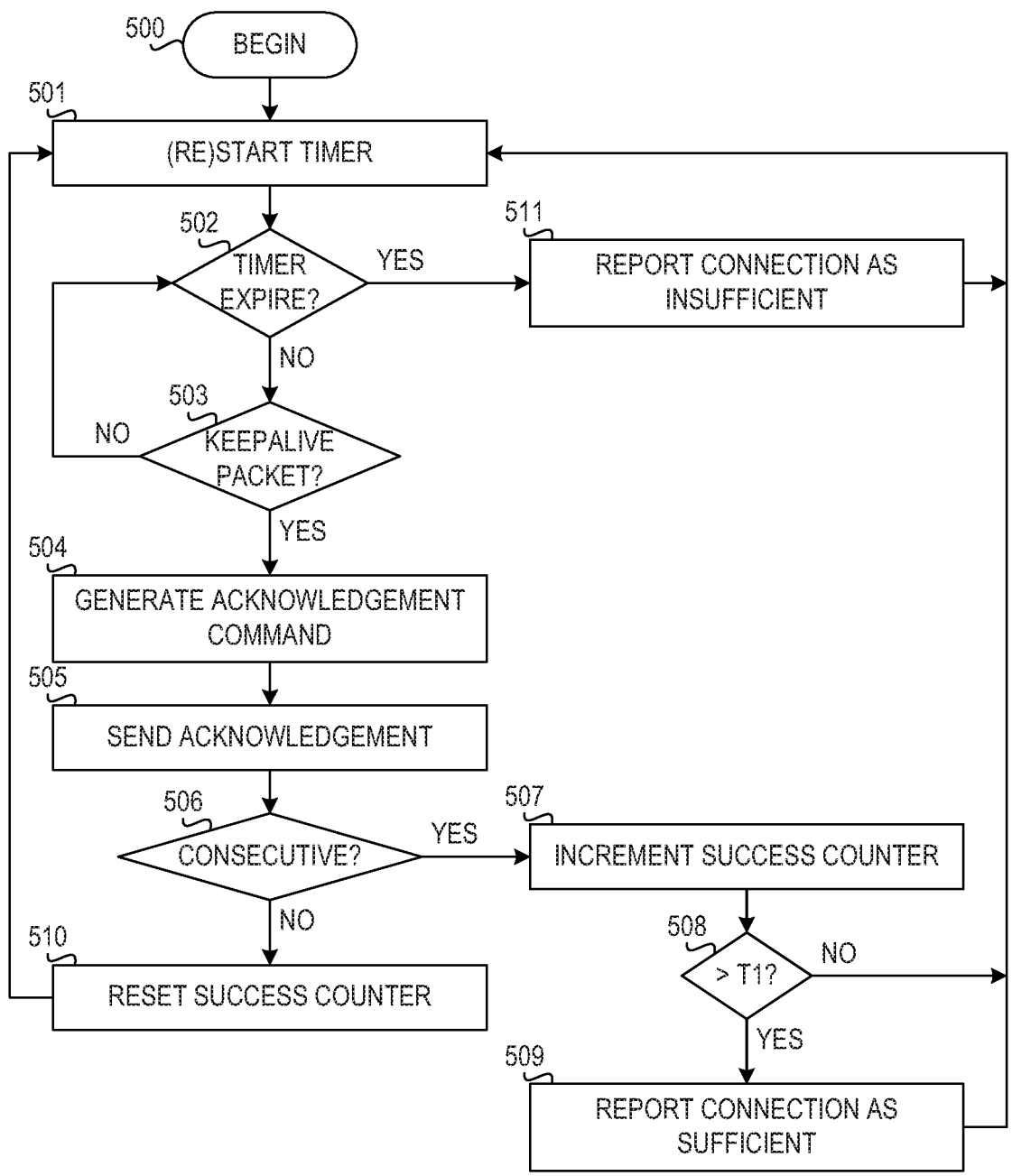
FIG. 5 is a flowchart illustrating operation of a target for symmetric connectivity over SCSI in accordance with an illustrative embodiment.

FIG. 5 is a flowchart illustrating operation of a target for symmetric connectivity over SCSI in accordance with an illustrative embodiment. Operation begins (block 500), and the target starts a time (block 501). The target determines whether the timer expires (block 502). If the timer does not expire, the target determines whether a custom keepalive command is received (block 503). If a keepalive command is not received, then operation returns to block 502 and repeats until the timer expires or a keepalive packet is received.

If a keepalive packet is received in block 503, then the target generates an acknowledgement command (block 504) and sends the acknowledgement to the initiator (block 505). The target determines whether the keepalive packet is consecutive (block 506). The target may determine whether the keepalive packet is consecutive by comparing the sequence number of the keepalive command with the sequence number of the last received keepalive command. If the keepalive packet is consecutive, then the target increments a success counter (block 507) and determines whether the success counter is greater than a first threshold (T1) (block 508). The first threshold may be equal to the first threshold at the initiator. Alternatively, the first threshold may have a different value than the first threshold at the initiator.

If the success counter is not greater than the first threshold (T1), then operation returns to block 501 to restart the timer. If the success counter is greater than the first threshold in block 508, then the target reports the connection as sufficient (block 509). The target may report the connection as sufficient to a central system. Thereafter, operation returns to block 501 to restart the timer.

Returning to block 506, if the target determines that the keepalive packet is not consecutive, then the target resets the success counter (block 510), and operation returns to block 501 to restart the timer.

Returning to block 502, if the timer expires, then the target reports the connection as insufficient (block 511). The target may report the connection as insufficient to a central system. Thereafter, operation returns to block 501 to restart the timer.

Thus, the initiator generates custom keepalive commands and uses sequence numbers to determine at substantially the same time when a failure occurs. The initiator and target inform each other when a failure is reported. The initiator and target both report a sufficient or insufficient connection to their respective central systems substantially at the same time. The illustrative embodiments maintain a split-direction SCSI connection while mitigating the risk of data becoming inconsistent between the two systems when a failure occurs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or early out combinations of special purpose hardware and computer instructions.

Figure 6:
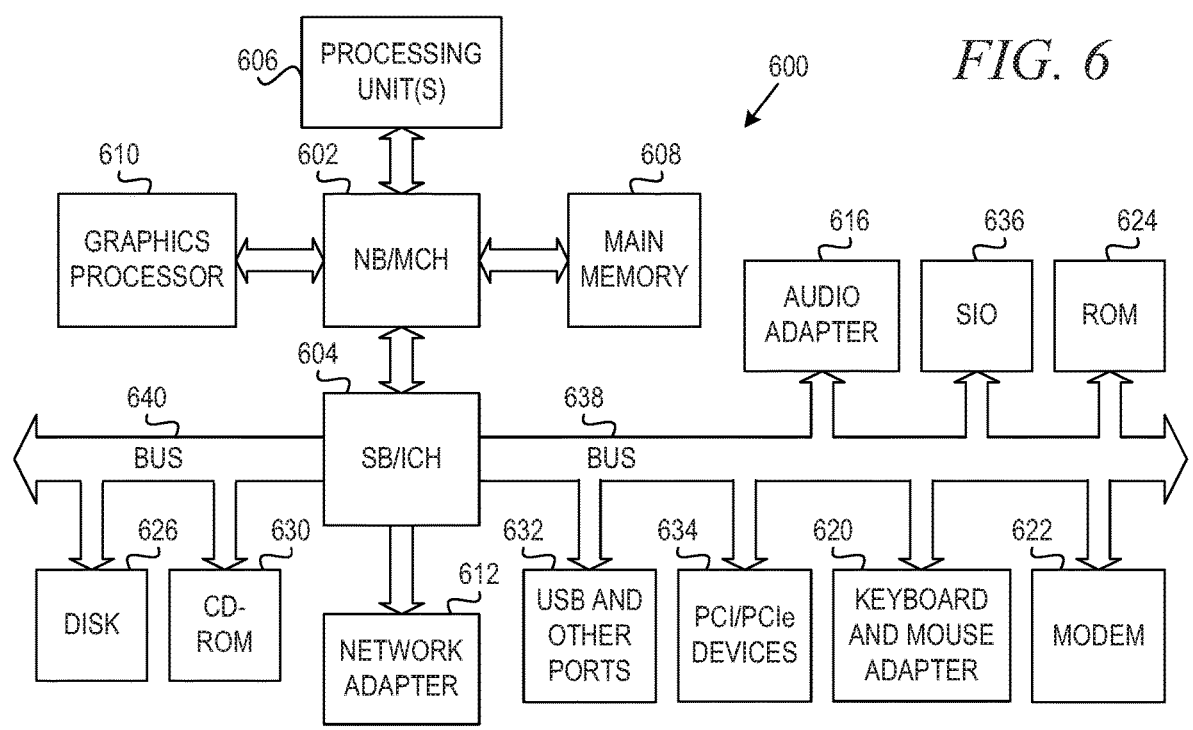
FIG. 6 is a block diagram of just one example data processing system in which aspects of the illustrative embodiments may be implemented.

As noted above, the mechanisms of the illustrative embodiments utilize specifically configured computing devices, or data processing systems, to perform the operations for symmetric connectivity over SCSI where the initiator and target are symmetric. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as an initiator 310 or target 330 in FIG. 3, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 600.

As a server, data processing system 600 may be, for example, an IBM eServer™ System P® computer system, Power™ processor based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described hereafter with regard to symmetric connectivity over SCSI.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement an initiator entity in a symmetric split-direction connection, the method comprising:
   generating, by the initiator entity, a custom keepalive command;
   sending the custom keepalive command from the initiator entity to a target entity via the symmetric split-direction connection;
   responsive to the initiator entity determining a first number of consecutive acknowledgement commands received exceeds a first threshold, reporting, by the initiator entity, the symmetric split-direction connection as sufficient to its central entity; and
   responsive to the initiator entity determining a second number of consecutive keepalive commands sent without receiving an acknowledgement is greater than a second threshold, reporting, by the initiator entity, the symmetric split-direction connection as insufficient to its central entity.

2. The method of claim 1, wherein the initiator entity generates and sends the custom keepalive command periodically in response to expiration of a timer at the initiator entity.

3. The method of claim 1, wherein the custom keepalive command is a custom small computer system interface (SCSI) command comprising a command descriptor block, wherein the command descriptor block comprises a subcommand identifier, a sequence number, a success count, and failure flag, wherein the success counter indicates the number of consecutive acknowledgement responses received, and wherein the failure flag indicates to the target entity whether the initiator entity is reporting the symmetric split-direction connection as insufficient.

4. The method of claim 1, wherein the values of the first threshold and the second threshold are chosen such that identifying a failure is quick and such that recovering from a failed connection takes significantly longer than identifying the failure.

5. The method of claim 4, wherein the first threshold is at least twice the second threshold.

6. The method of claim 1, further comprising incrementing, by the initiator entity, a success counter responsive to receiving a consecutive acknowledgement.

7. The method of claim 1, wherein determining the second number of consecutive keepalive commands sent without receiving an acknowledgement comprises subtracting a sequence number corresponding to a last received acknowledgement from a sequence number of a last sent keepalive command.

8. The method of claim 1, wherein the target entity monitors for keepalive commands and sends acknowledgements to the initiator entity for each keepalive command received from the initiator entity.

9. The method of claim 8, wherein the target entity reports the symmetric split-direction connection as insufficient responsive to expiration of a timer without receiving a keepalive packet; and
   wherein the target entity reports the symmetric split-direction connection as sufficient responsive to determining a number of consecutive keepalive commands received is greater than a threshold.

10. The method of claim 9, wherein the target entity determines the number of consecutive keepalive commands using a success counter.

11. A computer program product comprising a computer readable storage medium having a computer readable program stored therein, wherein the computer readable program, when executed on at least one processor of a data processing system, causes the data processing system to implement an initiator entity in a symmetric split-direction connection, wherein the computer readable program causes the data processing system to:
   generate, by the initiator entity, a custom keepalive command;
   send the custom keepalive command from the initiator entity to a target entity via the symmetric split-direction connection;
   responsive to the initiator entity determining a first number of consecutive acknowledgement commands received exceeds a first threshold, report, by the initiator entity, the symmetric split-direction connection as sufficient to its central entity; and
   responsive to the initiator entity determining a second number of consecutive keepalive commands sent without receiving an acknowledgement is greater than a second threshold, report, by the initiator entity, the symmetric split-direction connection as insufficient to its central entity.

12. The computer program product of claim 11, wherein the initiator entity generates and sends the custom keepalive command periodically in response to expiration of a timer at the initiator entity.

13. The computer program product of claim 11, wherein the custom keepalive command is a custom small computer system interface (SCSI) command comprising a command descriptor block, wherein the command descriptor block comprises a subcommand identifier, a sequence number, a success count, and failure flag, wherein the success counter indicates the first number of consecutive acknowledgement commands received, wherein the failure flag indicates to the target entity whether the initiator entity is reporting the symmetric split-direction connection as insufficient.

14. The computer program product of claim 11, wherein the values of the first threshold and the second threshold are chosen such that identifying a failure is quick and such that recovering from a failed connection takes significantly longer than identifying the failure.

15. The computer program product of claim 14, wherein the first threshold is at least twice the second threshold.

16. The computer program product of claim 11, wherein the computer readable program further causes the data processing system to increment, by the initiator entity, a success counter responsive to receiving a consecutive acknowledgement.

17. The computer program product of claim 11, wherein determining the second number of consecutive keepalive commands sent without receiving an acknowledgement comprises subtracting a sequence number corresponding to a last received acknowledgement from a sequence number of a last sent keepalive command.

18. The computer program product of claim 11, wherein the target entity monitors for keepalive commands and sends acknowledgements to the initiator entity for each keepalive command received from the initiator entity.

19. The computer program product of claim 18, wherein the target entity reports the symmetric split-direction connection as insufficient responsive to expiration of a timer without receiving a keepalive command; and wherein the target entity reports the symmetric split-direction connection as sufficient responsive to determining a number of consecutive keepalive commands received is greater than a threshold.

20. An apparatus comprising:

a processor; and a memory coupled to the processor, wherein the memory comprises instructions which, when executed by the processor, cause the processor to implement an initiator entity in a symmetric split-direction connection, wherein the instructions cause the processor to:

generate, by the initiator entity, a custom keepalive command;

send the custom keepalive command from the initiator entity to a target entity via the symmetric split-direction connection;

responsive to the initiator entity determining a first number of consecutive acknowledgement commands received exceeds a first threshold, report, by the initiator entity, the symmetric split-direction connection as sufficient to its central entity; and responsive to the initiator entity determining a second number of consecutive keepalive commands sent without receiving an acknowledgement is greater than a second threshold, report, by the initiator entity, the symmetric split-direction connection as insufficient to its central entity.

* * * * *